US 8,126,577 B2

(12) United States Patent
Ticknor et al.

(10) Patent No.: US 8,126,577 B2
(45) Date of Patent: Feb. 28, 2012

(54) MONITORING AND CONTROL OF ELECTRONIC DEVICES

(75) Inventors: Anthony J. Ticknor, Cupertino, CA (US); Jinghong Li, San Jose, CA (US); Robert Lombaerde, Belmont, CA (US)

(73) Assignee: NeoPhotonics Corporation, San Jose, CA (US)

( * ) Notice: Subject to any disclaimer, the term of this patent is extended or adjusted under 35 U.S.C. 154(b) by 0 days.

(21) Appl. No.: 12/248,594

(22) Filed: Oct. 9, 2008

(65) Prior Publication Data

US 2009/0099669 A1 Apr. 16, 2009

Related U.S. Application Data

(63) Continuation-in-part of application No. 11/144,413, filed on Jun. 3, 2005, now abandoned.

(51) Int. Cl.
| | |
|---|---|
| G01B 21/00 | (2006.01) |
| G05B 11/01 | (2006.01) |
| G05B 13/02 | (2006.01) |
| G05B 15/00 | (2006.01) |
| G05B 15/02 | (2006.01) |
| G05B 23/02 | (2006.01) |
| G06F 15/00 | (2006.01) |
| G09B 21/00 | (2006.01) |

(52) U.S. Cl. ............ 700/83; 700/9; 700/19; 700/39; 340/3.31; 340/3.43; 340/3.9; 340/4.11; 702/108; 702/127

(58) Field of Classification Search ............ 700/9, 17, 700/19, 83, 26, 27, 39; 340/3.1, 3.7, 3.71, 340/3.9, 3.31, 3.43, 4.11, 4.21; 702/188, 702/108, 120, 127
See application file for complete search history.

(56) References Cited

U.S. PATENT DOCUMENTS

| | | | |
|---|---|---|---|
| 6,091,806 A | 7/2000 | Rasmus et al. | |
| 6,515,746 B2 | 2/2003 | Opsal et al. | |
| 6,546,297 B1 | 4/2003 | Gaston et al. | |
| 6,590,644 B1 | 7/2003 | Coin et al. | |
| 6,697,750 B1 | 2/2004 | Coin et al. | |
| 6,823,219 B2 | 11/2004 | Lee et al. | |
| 6,961,871 B2 * | 11/2005 | Danialy et al. | ................. 714/30 |
| 7,154,924 B2 * | 12/2006 | Sanchez | ................. 372/29.02 |
| 7,200,448 B2 | 4/2007 | Cachat et al. | |
| 7,283,934 B2 | 10/2007 | Deller et al. | |
| 2004/0090616 A1 | 5/2004 | French et al. | |
| 2004/0102874 A1 * | 5/2004 | Crosby et al. | ................. 700/299 |
| 2005/0021839 A1 * | 1/2005 | Russell et al. | ................. 709/238 |
| 2005/0107897 A1 | 5/2005 | Callaghan | |
| 2005/0213080 A1 | 9/2005 | Huang et al. | |

(Continued)

OTHER PUBLICATIONS

International Search Report for PCT/US06/21012 dated Jun. 25, 2006.

*Primary Examiner* — Albert Decady
*Assistant Examiner* — Jennifer L. Norton
(74) *Attorney, Agent, or Firm* — Turocy & Watson, LLP

(57) ABSTRACT

A method, a system, and a computer program product for managing one or more electronic devices. Performance of an electronic device is monitored and presented to a user through a digital agent interface. The performance of the electronic device is controlled automatically by digital agent through the digital agent interface. The invention also enables automatic testing of the electronic device through the digital agent interface by setting up test configurations, activating test signals, and interpreting any error codes that may be generated.

8 Claims, 6 Drawing Sheets

U.S. PATENT DOCUMENTS

| | | |
|---|---|---|
| 2006/0108500 A1 | 5/2006 | Sada et al. |
| 2006/0108510 A1 | 5/2006 | Draper et al. |
| 2006/0241784 A1 | 10/2006 | Fredriksson |
| 2006/0241913 A1 | 10/2006 | De Groot et al. |
| 2007/0166041 A1 | 7/2007 | Le et al. |
| 2007/0174467 A1 * | 7/2007 | Ballou et al. .................. 709/227 |
| 2008/0022363 A1 | 1/2008 | Le et al. |
| 2008/0307073 A1 * | 12/2008 | Hachimura ................... 709/219 |
| 2008/0310835 A1 * | 12/2008 | Lorentzen et al. ................ 398/9 |
| 2009/0037146 A1 * | 2/2009 | Trowbridge et al. .......... 702/184 |

* cited by examiner

MONITORING AND CONTROL OF ELECTRONIC DEVICES

CROSS REFERENCE TO RELATED APPLICATIONS

The subject invention is a Continuation-in-Part of co-pending application Ser. No. 11/144,413 filed Jun. 3, 2005, which is hereby incorporated by reference.

BACKGROUND

The invention relates generally to the field of electronics and communications. More specifically, the invention relates to the field of monitoring and control of electronic devices.

Electronic devices need to be monitored and controlled to ensure their optimal performance. Early detection of potential problems enables effective control to prevent failure of the electronic device.

One such electronic device is a communication device. Communication devices are electronic devices that function to transmit and/or receive data across communication links. The communication devices utilize different methods to transmit the data. For example, optical communication devices transmit information across fiber-optic media by using light signals from laser light sources. Optical communication devices enable high-speed data transmission that has become necessary due to the exponential increase in communication traffic around the world. The communication traffic, especially traffic related to the increasing use of the Internet, has placed a heavy demand on communication systems worldwide. Hence, efficient monitoring and control of communication devices is necessary to ensure continuous operation and reduced downtime.

Controlling an electronic device entails modifying certain parameters of the electronic device to optimize its performance. In an optical communication device, these parameters can include the DC voltage supplied to the laser light source and its on-off levels. The parameters can be controlled by one or more Integrated Circuits (ICs) that are present inside the device. For instance, the device can contain an IC that amplifies input signals. Further, the ICs contain certain specifically addressable memory locations or registers. The registers store values related to the performance of the electronic device. Modifying the values in certain registers modifies the performance of the electronic device. Thus, a user can control the performance of the electronic device through these registers.

Monitoring of an electronic device involves monitoring various parameters. For example, parameters such as fiber attenuation, optical power, and chromatic dispersion of a transmitted light signal can be monitored in an optical communication device. The monitoring can be performed through monitoring components external to the electronic device, or through internal monitoring components. For example, an external monitoring component can be a photocell monitoring the output power of the laser light source of an optical communication device. Alternatively, a voltmeter monitoring the input voltage supply can be contained inside the device. The internal monitoring components can store the monitored parameters in registers in the electronic device. The user can then monitor these parameters by reading these registers. Some registers can also be used to store information that is specific to the electronic device. This information can include specifications such as the serial number, the model, and the manufacturer of the device.

An electronic device generally requires opening of the device for monitoring and control. In some cases, to avoid accidents, the functioning of the electronic device needs to be interrupted before opening it. Further, opening the electronic device and using tools to monitor and/or control it can damage the electronic device. Additionally, manual control may not be optimal. Opening of the electronic devices is also time-consuming. Therefore, continuous control of the devices, based on functional and environmental monitoring, is difficult. It is also difficult to integrate control of the electronic device along with continuous monitoring by external monitoring components.

Hence, there exists a need for a method and a system that enables automated control of electronic devices without the need for opening them. The method and the system should integrate the monitoring and control of electronic devices, along with external test equipment. Further, the system should enable integrated control and testing of the electronic devices, continuously optimizing their performance, based on internal and external monitoring of the functional and environmental parameters.

SUMMARY

The invention provides a method, a system, and a computer program product for monitoring and controlling one or more electronic devices.

An aspect of the invention is to manage one or more electronic devices, comprising monitoring the performance of at least one electronic device; presenting the monitored performance to a user through a digital agent interface; and controlling the monitoring, and the performance of the monitored electronic device, based on the monitored performance presented to a digital agent.

Another aspect of the invention is to manage one or more electronic devices, comprising monitoring the performance of at least one electronic device; presenting the monitored performance through a digital agent interface; controlling the monitoring, and the performance of the monitored electronic device, based on the monitored performance presented to the digital agent; and enabling the digital agent to control the performance of the monitored electronic device and the auxiliary electronic devices through the digital agent interface.

Yet another aspect of the invention is to provide a system to manage one or more electronic devices, comprising one or more monitoring components, a monitoring component monitoring the performance of at least one of the plurality of electronic devices; a computer, the computer running a process for presenting the monitored performance to a digital agent and for controlling the performance of the monitored electronic device and one or more auxiliary electronic devices; and at least one device interface, the device interface enabling communication between the plurality of electronic devices, the monitoring components and the computer.

Still yet another aspect of the invention is to provide a system for managing an optical communication device including an integrated circuit for controlling a parameter of the optical communication device; a monitoring component coupled to the optical communication device, for monitoring the parameter of the optical communication device, a value of the parameter is stored within a memory register of the optical communication device; a device interface, the device interface enabling two way communication between the optical communication device, the monitoring component, and the interface recognition/selection component, the two way communication comprising at least one of a management data input-output interface or a general purpose input/output interface; a digital agent interface that outputs the parameter monitored according to a digital agent selectable interface, the digital agent interface is configured to receive an input in response to the output and forward the input to the device interface to adjust performance of the optical communication device; and an interface recognition/selection component that adapts the device interface to comply with communications protocols of the digital agent interface.

Still yet another aspect of the invention is to provide a method of emulating a direct-memory interface for storage and retrieval of diagnostic parameters for an optical communications device comprising a device interface providing methods for intercepting a request from a host for directly accessing a predefined memory location having diagnostic information; analyzing the request to determine an address of the requested predefined memory location; correlating a diagnostic parameter expected to be stored in the requested predefined memory location at the address and remapping the request to an actual method of retrieving or storing the diagnostic parameter; and executing the actual method for retrieving or storing the diagnostic parameter and presenting a result back to the host in accordance with the request for direct-memory access.

A method and a system, in accordance with the invention, enable integrated monitoring and control of one or more electronic devices. An electronic device is monitored by monitoring components that can be external to or internal to the electronic device. The monitored performance is presented to a digital agent through a digital agent interface. The monitored performance can be presented to the user through a concise interface, as well as through a comprehensive interface that provides detailed information about the performance parameters. The system also enables automatic as well as manual control of the performance of the electronic device through the digital agent interface. The system integrates monitoring and control of the electronic device along with the control of the monitoring components. The system further enables automatic testing of the electronic device through the digital agent interface by setting up test configurations, activation of test signals, and interpretation of any error codes that may be generated. The system also enables saving of the data related to monitoring, control and testing of the electronic device.

BRIEF DESCRIPTION OF THE DRAWINGS

The embodiments of the invention will hereinafter be described in conjunction with the appended drawings provided to illustrate and not to limit the invention, wherein like designations denote like elements, and in which.

DETAILED DESCRIPTION

Embodiments of the invention provide a method, system, and a computer program product for managing one or more electronic devices. The performance of the electronic devices is monitored and presented to a user through a graphical user interface. The interface further enables the user to control the electronic devices, either manually or automatically, based on the monitored performance. The embodiments of the invention will now be described in detail, with reference to the illustrations.

Figure 1:
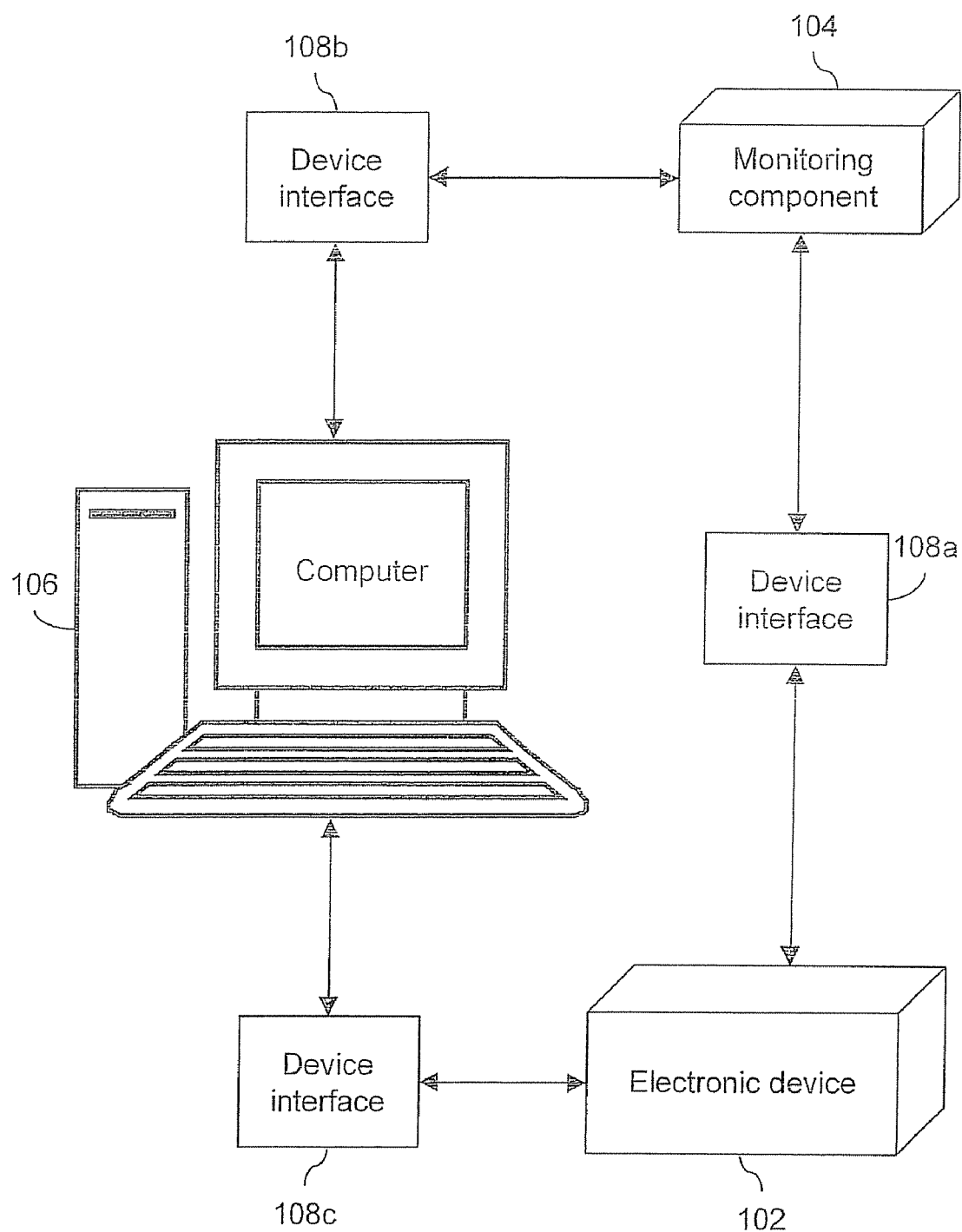
FIG. 1 illustrates a system environment for managing an electronic device, in accordance with various embodiments of the invention.

FIG. 1 illustrates a system environment for managing an electronic device, in accordance with various embodiments of the invention. The system environment includes an electronic device 102, a monitoring component 104, a computer 106, and device interfaces 108a, 108b, and 108c. Monitoring component 104 monitors the performance of electronic device 102, through device interface 108a. The monitored performance of electronic device 102 is communicated to computer 106 through device interface 108b. Computer 106 runs a process to present the monitored performance to a user. Computer 106 further enables manual control as well as automatic control to manage the performance of electronic device 102 through device interface 108c. The system elements of FIG. 1 are explained in detail hereafter.

Electronic Device 102

Electronic device 102 is a device performing its function through electronic means. In various embodiments, electronic device 102 is a communication device, such as an optical communication device, a copper wire transceiver, a radio transmitter, or any other electronic device that can be monitored and controlled. FIG. 1 illustrates only one electronic device 102. However, the number of electronic devices that can be supported by the various embodiments of the invention is not limited to one. The embodiments of the invention can enable simultaneous managing of two or more electronic devices.

Monitoring Component 104

Monitoring component 104 monitors the performance of electronic device 102. Monitoring component 104 is a device that is capable of monitoring the performance of electronic devices. Exemplary performance parameters being monitored include, but are not limited to temperature, wavelength, input signals, etc. For example, monitoring component 104 can be a spectrometer that monitors the wavelength of a light signal transmitted by an optical communication device. Another example of monitoring component 104 is a thermometer that monitors temperature of electronic device 102.

In one embodiment of the invention, monitoring component 104 is present inside electronic device 102. In this case, the monitored parameters can be stored in specific registers inside electronic device 102. Computer 106 reads these registers to acquire the information related to the monitored performance. In another embodiment, monitoring component 104 resides outside electronic device 102.

In an embodiment of the invention, monitoring component 104 is dedicated to monitor only one parameter related to electronic device 102. An example is a thermometer inside electronic device 102 that monitors only the environmental temperature. Alternatively, monitoring component 104 can monitor a plurality of parameters. For example, an oscilloscope can monitor both the input signals and the amplified signals inside electronic device 102.

In one embodiment, monitoring component 104 is a passive device that only monitors the performance of electronic device 102. For example, a thermometer monitors the temperature. In another embodiment, monitoring component 104 is an active device that monitors as well as modifies the performance of electronic device 102. For example, a test signal generator provides test signals for transmission to a communication device and then monitors the communication signal transmitted by the communication device.

In an embodiment of the invention, monitoring component 104 is dedicated to monitor only one electronic device. In another embodiment, monitoring component 104 monitors a plurality of electronic devices. Similarly, electronic device 102 can be monitored by a single monitoring component or by a plurality of monitoring components.

Computer 106

The monitored performance is presented to a user through a graphical user interface (GUI) on computer 106. Computer 106 is a computing device capable of presenting the monitored performance of electronic device 102 to a user. Computer 106 also enables control of electronic device 102, either automatically or manually by the user. In various embodiments, computer 106 is dedicated to the system for managing a plurality of electronic devices. In other embodiments, computer 106 is a multiprocessing unit that runs other processes apart from managing electronic device 102. In an embodiment, the system comprises a plurality of computers for managing one or more electronic devices. The embodiments of the invention can be implemented in all types of computers such as, but not limited to, mainframes, desktops, servers, laptops, and notebooks.

A GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed.

Device Interfaces 108a, 108b, and 108c

Communication between computer 106, monitoring component 104, and electronic device 102 is enabled by device interfaces 108a, 108b, and 108c. In one embodiment, a plurality of monitoring components can be connected to computer 106 through one device interface. Similarly, a plurality of electronic devices can be connected to computer 106 through one device interface. In an alternate embodiment, the electronic devices as well as monitoring components can be connected to computer 106 through the same device interface. Alternatively, each monitoring component and electronic device may use a distinct device interface for communication with computer 106.

In an embodiment of the invention, device interface 108c between computer 106 and electronic device 102 is a Management Data Input Output (MDIO) communication interface. Electronic device 102 can contain internal ICs that communicate with the MDIO through an Inter-IC (I2C) bus. In various embodiments, device interface 108c is a general purpose input/output (GPIO) interface. Similarly, in some embodiments, device interface 108b between monitoring component 104 and computer 106 can also be an MDIO interface or a GPIO interface. Further, in various embodiments of the invention, device interfaces between different electronic devices and computer 106, and between different monitoring components and computer 106 can follow different communication standards. The device interfaces enable two way communication with the electronic device to pass the monitored signals to the computer as well as to pass commands from the computer to the electronic device.

Figure 2:
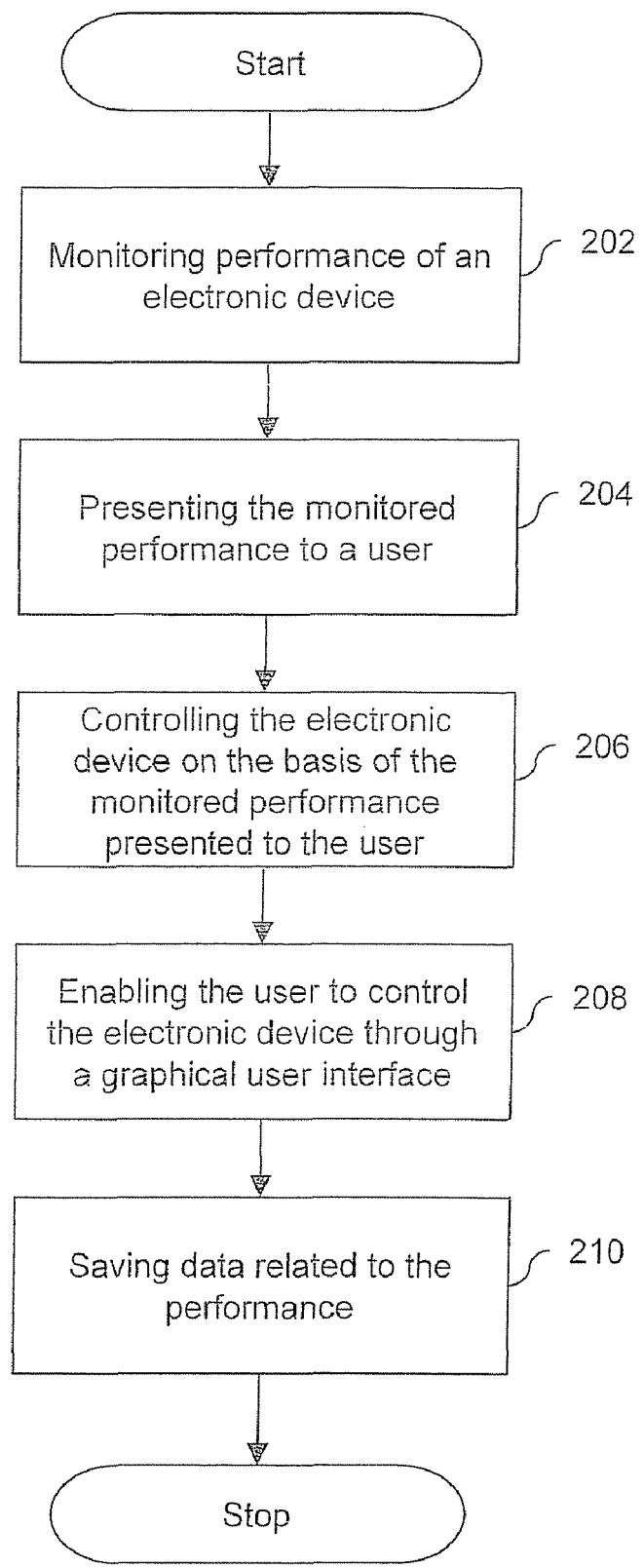
FIG. 2 is a flow chart that illustrates a method to manage a plurality of electronic devices, in accordance with various embodiments of the invention.

In accordance with various embodiments, the invention provides a method for managing a plurality of electronic devices. The flowchart for the method is illustrated in FIG. 2.

At step 202, the performance of electronic device 102 is monitored by monitoring component 104. At step 204, the monitored performance is presented to the user through computer 106. At step 206, the performance of electronic device 102 is controlled, based on the monitored performance presented to the user. At step 208, the user is enabled to control electronic device 102 through a GUI presented on computer 106. At step 210, the data related to the performance of electronic device 102 is saved. Some of the method steps and their various embodiments are hereinafter described in detail.

Monitoring the Performance of the Electronic Device, i.e., Step 202

Monitoring of electronic device 102 by the monitoring component 104 involves monitoring of various parameters related to electronic device 102. The parameters can be related to the environment of electronic device 102, such as temperature, humidity, and voltage supply. The parameters can also be related to the specifications of electronic device 102, such as the manufacturer's name, model number, and device serial number. Further, the parameters can be related to the functions performed by electronic device 102. For example, in one embodiment, electronic device 102 is an optical communication device. In this case, the monitored parameters include optical power of light source, fiber attenuation, chromatic dispersion, alignment of fibers, polarization of light, bias current, extinction ratio, voltage supply to light source, input signal level, transmitted signal level, and received signal level. The list of parameters is illustrative only. It will be apparent to a person skilled in the art that the monitored parameters will vary with the specific electronic device monitored. Hence, the different parameters that can be monitored by the method and system of the present invention are not limited by the list provided.

In one embodiment, monitoring component 104 communicates the monitored performance of electronic device 102, to computer 106, continuously through device interface 108b. Continuous monitoring of electronic device 102 provides a real-time status of the performance. In another embodiment, the monitored performance is communicated to computer 106 at regular time intervals. Alternatively, the monitored parameters are communicated to computer 106 by exception, when the monitored performance falls outside a desired range. The desired range can vary with the monitored parameter and the specific electronic device. For example, the input voltage range for one electronic device can be 105V-115v, while for another electronic device the input voltage range can be 220V-240V.

Presenting the Monitored Performance to a User, i.e. Step 204

In an embodiment of the invention, the performance of electronic device 102, monitored by monitoring component 104, is presented to a user through a GUI on computer 106.

In one embodiment of the invention, the monitored performance is presented to the user through a concise interface. The concise interface presents information suitable for a daily operator of the system. The daily operator is a user who operates electronic device 102 on a daily basis, and who does not need to delve into the detailed performance of electronic device 102. The performance status of electronic device 102 can be presented using different colors. The interface can also provide alarms to alert the operator when the monitored performance is outside the desired range. Further, the interface can prompt the operator for corrective actions that are required to be taken, in response to the alerts. In addition, the operator can be provided a description about any error codes that may be generated during the monitoring. In an embodiment of the invention, where electronic device 102 is a communication device, the interface can present the activity status of the device, data transfer rate, and usage information about the device. The interface can incorporate alarms when the voltage supplied to the communication device falls below the desired range, and prompt the operator to check the power supply.

In another embodiment, the monitored performance is presented to the user through a comprehensive interface. The comprehensive interface presents detailed information that is suitable for a technical specialist in the field of electronic device 102. Herein, the technical specialist is a user who is interested in the detailed performance of electronic device 102. The interface presents individual values of the monitored parameters. The interface can also present readout of individual registers of electronic device 102. Further, information related to troubleshooting of the performance can be provided to the user. In an embodiment of the invention, where electronic device 102 is an optical communication device, the bit rate of the communication connection, the input signal level, signal modulation frequency, wavelength of light transmitted, and current levels to the laser light source can be some of the values that are presented to the user.

Controlling the Performance of the Electronic Device, i.e., Step 206

Controlling of the performance of electronic device 102 involves modifying the various parameters of electronic device 102, in order to optimize its performance. The parameters modified are specific to the electronic device and are related to its function. For example, in an optical communication device, the parameters that can be modified include bias current, extinction ratio, voltage supply to light source, and transmission power. This list is not comprehensive and it will be apparent to a person skilled in the art that there exist numerous other parameters that can be modified to control the performance of an optical communication device in particular and an electronic device in general.

In one embodiment of the invention, electronic device 102 contains ICs. The embodiments of the invention enable controlling the ICs inside electronic device 102 to control the performance of electronic device 102. In one embodiment, the ICs are programmed to enable individual monitoring and control of the ICs contained inside electronic device 102. For instance, where electronic device 102 is an optical communication device, the device can control individual ICs for amplifying input signal level, changing the extinction ratio, changing bias current to the LED light source. In various embodiments, the invention enables individual control of all the ICs, hence enabling individual control of the different functions performed by the ICs.

In an embodiment, the invention enables automatic control of the performance of electronic device 102 based on its monitored performance. The performance of electronic device 102 is modified automatically to optimize it, based on the changes observed during monitoring. For example, an embodiment of the invention can enable controlling of electronic device 102 to compensate for any change in the temperature of the environment. Hence, the performance of electronic device 102 is automatically optimized for the environmental temperature.

In another embodiment, the invention enables a user to control the performance of electronic device 102, through a GUI. The user controls the performance of electronic device 102, based on the monitored performance presented to him through the GUI.

In one embodiment of the invention, the GUI provides a concise interface for the user to control the performance of electronic device 102. The daily operator can use this interface to control the routine parameters related to the performance of electronic device 102. In an embodiment, where electronic device 102 is a communication device, operator control can be enabled for parameters such as protocol used and speed for the data transfer.

In another embodiment, the GUI provides a comprehensive interface for the user. The comprehensive interface enables the technical specialist to individually control specialized parameters, and specific ICs inside electronic device 102. The interface enables the user to modify the values of individual registers inside electronic device 102. In an embodiment, the invention enables a user to enter company- and device-specific information in the registers such as the serial number of the device, manufacturer name and model specifications. In an embodiment, where electronic device 102 is an optical communication device, the comprehensive interface enables the user to control various parameters such as laser optical levels, signal modulation, and bias current settings.

In various embodiments of the invention, controlling of electronic device 102 is incorporated with the monitoring to enable its integrated testing. The testing can also be integrated with the performance monitored by monitoring components that are external to electronic device 102. Further, an embodiment of the invention enables control of monitoring component 104 along with simultaneous monitoring and control of electronic device 102. Additionally, the embodiment of the invention also enables looping of test signals, through electronic device 102, back to monitoring component 104. Hence, the embodiments of the invention enable comprehensive tests on electronic device 102, controlling the various device parameters, while simultaneously monitoring the performance of electronic device 102, through internal and external monitoring components. This enables determining the level of performance of electronic device 102. Further, any errors in the performance and reasons for these errors can be determined.

In an embodiment of the invention, the user performs various tests on electronic device 102, by selecting the test through the GUI. In various embodiments, the invention automatically sets up test configurations for electronic device 102 and monitoring component 104, based on the test selected by the user. The results of the tests can be presented in a concise interface such as through pass or fail indications. Alternatively, the results can be presented in a comprehensive manner, such as detailed register listings.

In an embodiment, where electronic device 102 is an optical communication device, the invention enables loop-back of both optical signals as well as electrical signals. Monitoring component 104 generates test data for transmission by the optical communication device. The light signals that are transmitted by the optical communication device are looped back to monitoring component 104. This enables testing efficiency of data transmission by the optical communication device. Further, monitoring component 104 can generate test signals for modifying the various parameters and registers of the optical communication device. The changes in the performance of the optical communication device, and the internal register values are looped back to monitoring component 104. This enables comprehensive testing to correlate the errors in the performance along with the internal causes of the errors. The embodiments of the invention enable automated testing by setting up suitable configurations for the optical communication device and monitoring component 104. The embodiments of the invention enable automatically attenuating routine communications through the optical communication device, turning on generation of the test signals, and looping back signals from the optical communication device to monitoring component 104.

Saving Data Related to the Performance, i.e., Step 208

In one embodiment of the invention, the data related to monitoring, controlling, and testing of the performance of electronic device 102, is saved by computer 106. This data can be used for future analysis and optimization of the performance of electronic device 102. In various embodiments, the invention enables automatic saving of the data related to monitoring and control, in a Microsoft Excel file format or any other suitable format.

Figure 3:
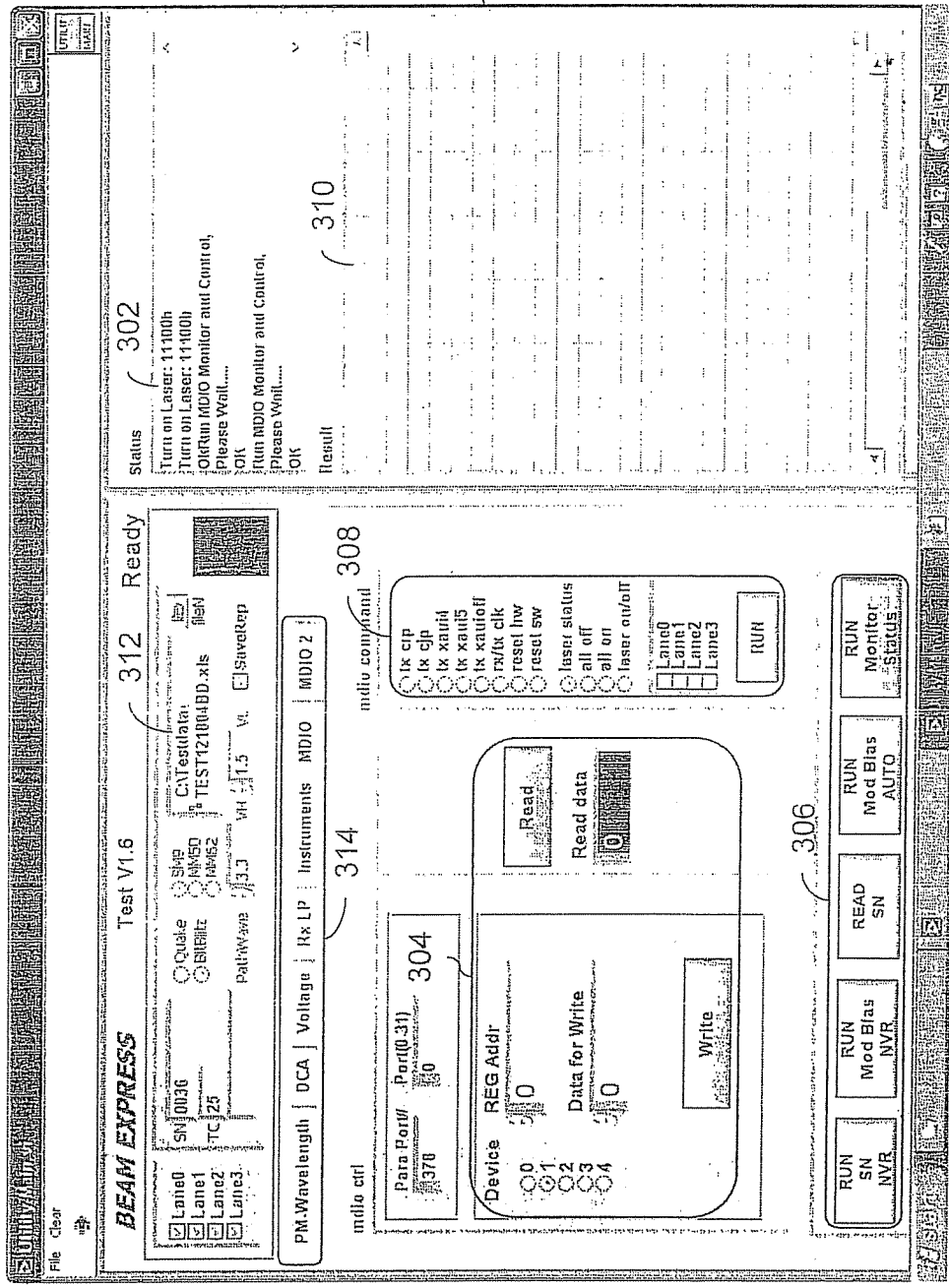
FIG. 3 is a screenshot illustrating a graphical user interface, in accordance with various embodiments of the invention.

FIG. 3 illustrates a GUI 300, in accordance with various embodiments of the invention. GUI 300 provides a comprehensive interface for the user to monitor, control, and save the performance related data for electronic device 102. GUI 300 is depicted only for illustration purposes. The specific interface can vary in different embodiments of the invention. In this case, electronic device 102 is an optical communication device. The monitoring and control of the optical communication device is performed through MDIO. GUI 300 presents the monitored performance of the optical communication device in a concise format through an interface 302. An interface 304 enables a user to read and write data in individual registers in the optical communication device.

GUI 300 also provides a set of buttons 306. Buttons 306 enable the user to run specific tests and commands on the optical communication device. According to an embodiment of the invention, buttons 306 can comprise a 'Run SN NVR' button. The 'Run SN NVR' button enables the user to enter the serial number in the registers of the optical communication device. Another button, 'Run Mod Bias NVR' enables the user to manually control the amplitude and drive level of the laser in the optical communication device. Buttons 306 also comprise a 'Read SN' button. According to an embodiment of the invention, the 'Read SN' button reads the serial number entered in the optical communication device. Buttons 306 also comprise a 'Run Mod Bias Auto' button that enables automatic control of the amplitude and drive level of the laser. Buttons 306 also comprise a 'Run Monitor Status' button, which displays the status of the optical communication device through colored indicators.

The user can run further device-specific and detailed commands on the optical communication device through an interface 308. The results of the tests and the commands run by the user are presented in a detailed listing through an interface 310. The data related to the monitoring, control, and testing is saved through an interface 312.

A set of tabs 314 further enables the user to monitor, control, and test other parameters of the optical communication device and external monitoring components that are managed by GUI 300. According to the embodiment, tabs 314 include 'PM-Wavelength', 'DCA', 'Voltage', 'Rx LP', 'Instruments', 'MDIO', 'MDIO 2', The 'PM-Wavelength' tab enables the optical communication device to transmit signals and loops the optical signals to a wavelength meter. The wavelength meter is then controlled to read the optical wavelengths and display the results on GUI 300. The 'DCA' tab loops the optical signal to a digital signal analyzer (DCA). The DCA can then be controlled through GUI 300 to monitor specific parameters of the optical communication device. In this case, the user does not need to manually press the switches on the DCA. The 'Voltage' tab enables the user to select the power supply and control the voltage of the power supply for the optical communication device. The 'Rx LP' tab enables loop back testing of the optical communication device by activating an internal data pattern and measuring received errors, while simultaneously increasing optical attenuation. The 'Instruments' tab enables individual control of the instruments through a GPIO interface. The 'MDIO' tab enables control of registers to display and control the status of the optical communication device through colored indicators. The 'MDIO 2' tab displays the temperature and resistive settings of the laser light sources.

The interfaces, buttons, and tabs illustrated in FIG. 3 should not be construed to limit the scope of the invention. The actual interface can vary in different embodiments of the invention.

Alternatively, instead of using a GUI, a digital agent can be programmed to anticipate and/or respond to the foreseeable and/or likely variations in a network of one or more communications devices. A digital agent is typically in the form of a computer program running in a management system of a communications device such as one or more optical communications devices. The digital agent can access, receive, and/or process information relating to one or more of the network, communications devices within the network, devices coupled to or communicating with the network, or other factors affecting the network and its components over a digital agent interface (DAI). In some embodiments, the DAI is analogous to the GUI discussed previously.

The optical communications components of the network can support a physical data interface (MDIO or general purpose, and particularly I2C) which carries the higher-level logical interfaces (protocols) required of the inventive management systems. Since the optical devices within a network may need to support interaction through different logical interfaces, individual optical communications devices can include features for complying with different logical interfaces. Such features can be provided by reprogramming the software/firmware of the integrated circuit (such as a programmable integrated circuit; i.e., a microcontroller) coupled to or of the optical communications devices. Reprogramming is accomplished, for instance, by downloading a new program from a suitable program source such as the management system, and/or commanding the communications device to select from multiple preloaded firmware modules. The optical communications device having features to support differing logical interfaces can also support selectable interface modules to provide emulation and interoperability with other logical interfaces such as the older digital diagnostics and monitoring digital diagnostics (DDM) interface.

Using an optical device with a microcontroller to provide interoperability without directly implementing the physical interface means described in DDM (generally which specifies what goes where in various internal memory locations). Optical communications devices with microcontrollers can be programmed to facilitate multiple tasks thereby providing versatility, especially versatility in providing a selection of different logical interfaces.

Figure 4:
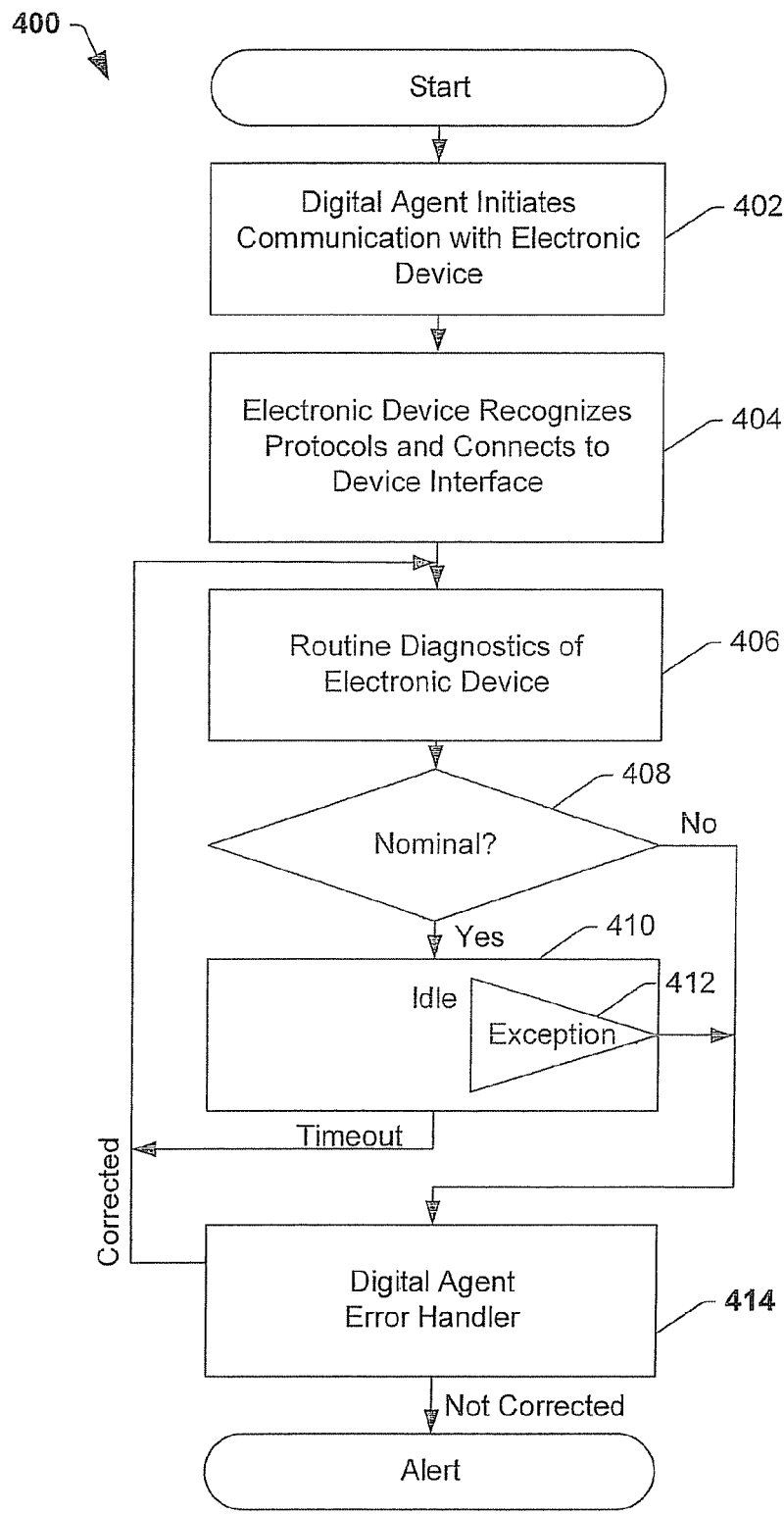
FIG. 4 is a flow chart that illustrates a method to manage a plurality of electronic devices, in accordance with various embodiments of the invention.

Referring to FIG. 4, a flowchart illustrating a method 400 for controlling one or more electronic devices, such as one or more optical communications devices, using a digital agent is depicted. At 402, the digital agent begins by initiating communication with the electronic device(s). The electronic device is capable of connecting to multiple types of logical interfaces. At 404, the electronic device can recognize an attempt at connecting and connects using an appropriate interface definition. This allows the electronic devices to also interface to legacy, less sophisticated control systems such as DDM/SFF8472, SFF8079/89 protocol systems.

Specification SFF8472 involves a multivendor agreement for providing digital diagnostic and monitoring of optic modules (Small Form factor Pluggable Multi-Source Agreement (SFP MSA)). Specification SFF8472 is hereby incorporated by reference. The SFF8472 specifies an electrical interface, such as interface 240, as a two wire serial interface.

After establishing connection, at 406 routine diagnostics of the electronic devices can be run either/both from the digital agent and from procedures programmed into the electronic devices. Anytime an anomalous situation occurs, at 408 the digital agent error handler can try to correct, compensate, and/or raise an alert to the system operations. If diagnostics are acceptable, the electronic devices can go to an idle mode for monitoring and the digital agent need not interact with the electronic devices. At 410, the idle procedure in the electronic devices can recognize certain degradations (that is, exceptions) at 412 requiring system attention and invoke the digital agent error handler 414 to appropriately respond. The idle procedure at 410 of the electronic devices or the digital agent can also retrigger various subroutines for diagnostics based on elapsed time or other variables not triggered by operations exceptions.

Figure 5:
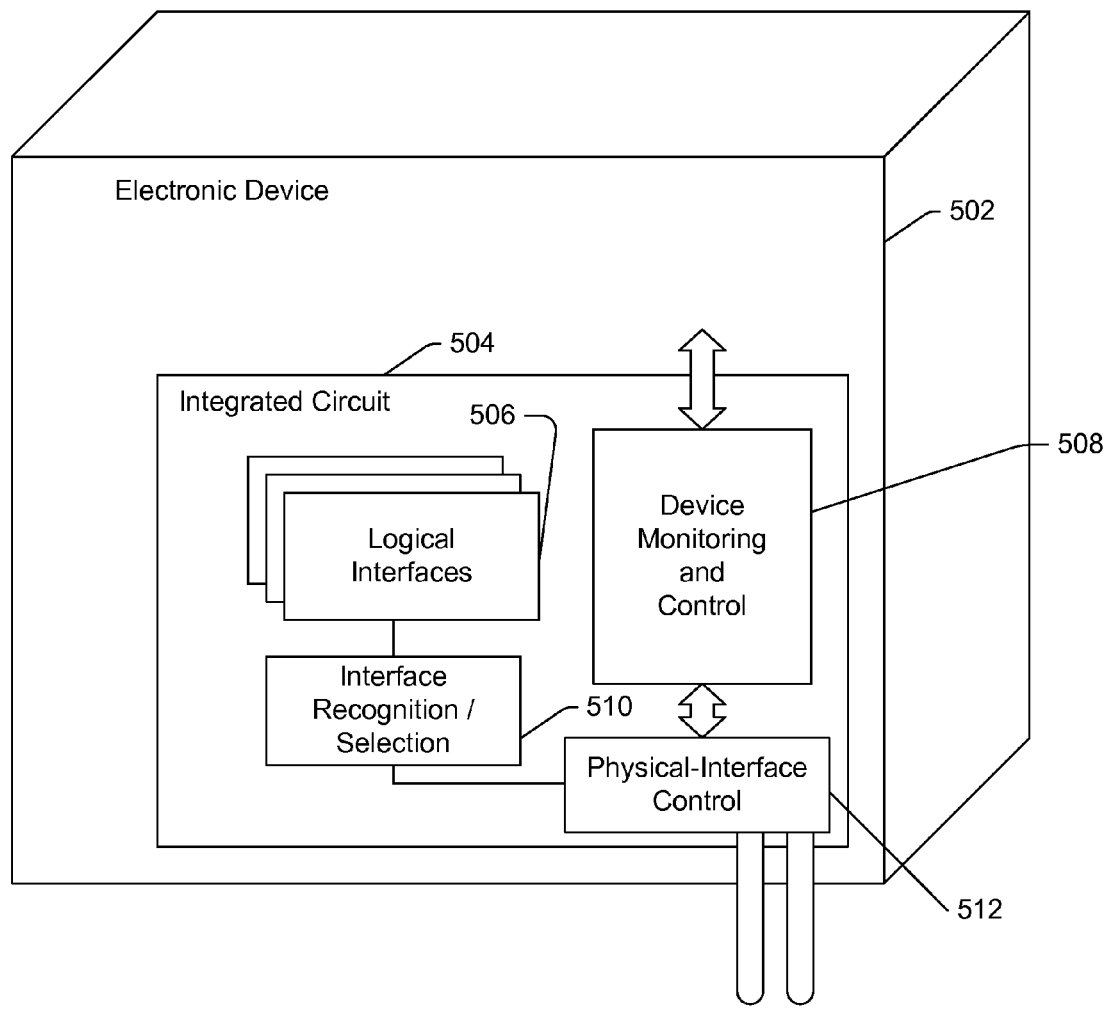
FIG. 5 illustrates a system environment for managing an electronic device, in accordance with various embodiments of the invention.

Referring to FIG. 5, the electronic device 502 may contain one or more programmable ICs 504. The programmable ICs 504 can be deployed on commercially available ICs, microcontrollers, programmable logic controllers (PLC's), personal computers (PC's) and the like, session border controllers (SBCs), etc. within or connected to the IC 604. The IC 504 can control the physical interface protocols and, within certain parameters, signal levels using a device monitoring and control component 508. The device monitoring and control component 508 allows an electronic device 502 to support differing device interfaces. The IC logic instructions for particular interfaces can be stored into one or more programmable memory block 506 in the electronic device 502 (usually on the IC). The logical interface blocks 506 can be burned into the electronic device 502 at manufacturing time, or may be reprogrammable thorough a programming device interface. Since the electronic device 502 can interoperate in various systems having different device interface specifications, some of which of the older types of systems not being sophisticated enough to identify themselves, the electronic device 502 using an interface recognition/selection component 510 is capable to some extent of recognizing the protocols of the attached system then selecting and loading a suitable interface for communicating in that system, even if the system is an older type. In other words, an optical communications device can emulate, via programming, devices that were specifically built to comply with specific legacy systems requiring specific hardware interfaces. A physical-interface control component 512 facilitates interoperability in various systems having different device interface specifications. Legacy interfaces include direct-memory-access interfaces like DDM/SFF8472 among others.

Figure 6:
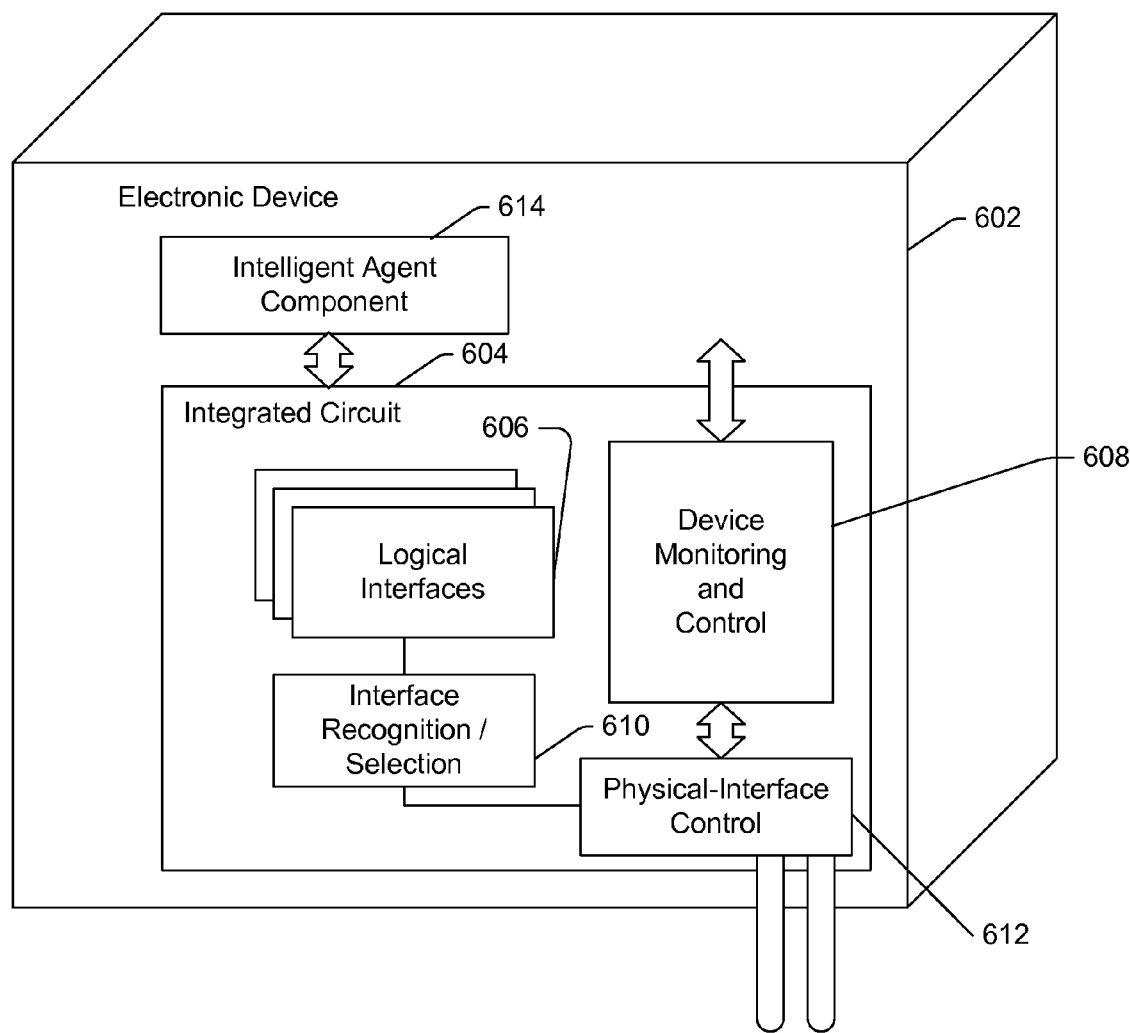
FIG. 6 illustrates a system environment for managing an electronic device, in accordance with various embodiments of the invention.

Referring to FIG. 6, the electronic device 602 may contain one or more programmable ICs 604 and an intelligent agent component 614. The electronic device 602 also contains one or more programmable memory blocks 606, a device monitoring and control component 608, an interface recognition/selection component 610, and a physical-interface control component 612.

The intelligent agent component 614 that can be deployed on commercially available ICs, microcontrollers, PLC's, PC's and the like, SBCs, etc. within or connected to the IC 604. It is to be appreciated that the claimed subject matter can include multiple types of and/or multiple intelligent agent components 614. Moreover, it is to be understood that the intelligent agent component 614 can be a stand-alone component or incorporated into the IC 604. The intelligent agent component 614 can provide holonic system capabilities and the eventual transition to autonomous agents, which can respond to unexpected detections/data, the ability to dynamically respond to the unexpected detections/data. The intelligent agent component 614 can allow highly distributed diagnostics to sense an unfavorable condition and prescribe a superior countermeasure.

The intelligent agent component 614 can utilize a suite of simulation, prototyping, and/or deployment tools in accordance with the subject innovation. By deploying the intelligent agent component 614, unprecedented interface recognition/selection can be provided as well as consequent overall network operational benefits. The electronic device 602 can significantly enhance the quality, interface recognition/selection, diagnostic reliability, and efficacy of a network and communication components therein. Furthermore, real-time process information can be utilized for closed-loop feedback control, adaptive process model development, predictive interface selection/recognition, and other intervention applications.

The electronic device 602 can enable the network and/or communication components to function during dynamic stress, conventional incompatibility of components, and conventional interoperability of components. Moreover, the intelligent agent component 614 can adhere to published agent-to-agent communication protocols (e.g., Foundation for Intelligent Physical Agents (FIPA)) and provide local selection, recognition, intervention, and decision-making along with more overall network operability goals.

It is to be understood that the intelligent agent component 614 can provide for reasoning about or infer states of the system, component, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

It will be evident to a person ordinarily skilled in the art that one or more of the embodiments mentioned above provide the following advantages for managing a plurality of electronic devices. The embodiments of the invention enable integrated monitoring and control of electronic devices through a user-friendly interface. The embodiments of the invention also enable continuous monitoring of the performance of the electronic devices. A real-time status of the performance of the electronic devices is presented to a user, and the embodiments of the invention enable the user to control the electronic devices based on the monitored performance. Furthermore, the embodiments of the invention enable automatic control of the electronic devices to optimize the performance based on the monitored parameters. The embodiments of the invention also enable integrated monitoring and control of the electronic devices along with external monitoring components to present a comprehensive status of the performance of the electronic devices. In addition, the embodiments of the invention enable automated testing of the electronic devices, and eliminate the need for opening of the electronic devices for tests.

The system, as described in the present invention or any of its components, may be embodied in the form of a computer system. Typical examples of a computer system includes a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. A computer comprises a microprocessor. This microprocessor is connected to a communication bus. The computer also includes a memory. This memory may include Random Access Memory (RAM), Read Only Memory (ROM), programmable ROM (PROM), electrically programmable ROM (EPROM), electrically erasable programmable ROM (EEPROM), or flash memory, static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). A computer system further comprises a storage device. It can be a hard disk drive or a removable storage drive such as a floppy disk drive, optical disk drive and so forth. A storage device can also be other similar means for loading computer programs or other instructions into the computer system.

The computer system executes a set of instructions that are stored in one or more storage elements, in order to process input data. The storage elements may also hold data or other information as desired. The storage element may be in the form of an information source or a physical memory element present in the processing machine. The processing of input data by the processing machine may be in response to user commands, or in response to results of previous processing or in response to a request made by another processing machine.

The set of instructions may include various commands that instruct the processing machine to perform specific tasks such as the steps that constitute the method of the present invention. The set of instructions may be in the form of a software program. The software may be in various forms such as system software or application software. Further, the software might be in the form of a collection of separate programs, a program module with a larger program or a portion of a program module. The software might also include modular programming in the form of object-oriented programming. The instructions can also be implemented using only software programming or using only hardware or by a varying combination of the two techniques. The instructions are independent of the programming language used and the operating system in the computers. The instructions for the invention can be written in all programming languages including, but not limited to 'C', 'C++', 'Visual C++' and 'Visual Basic'. The instructions can be implemented in all operating systems and platforms including, but not limited to 'Unix', 'DOS', and 'Linux'.

The instructions for implementing the method and the system can be stored and transmitted on a computer readable medium. The set of instructions can also be transmitted by data signals across a carrier wave. Further, the invention can be embodied in a computer program product comprising the computer readable medium, the product capable of implementing the above methods and systems, or the numerous possible variations thereof.

As utilized herein, terms "component," "system," "interface," "device," "generator," "collector," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the techniques of the invention. The claimed subject matter contemplates the use from the standpoint of an API (or other software object), as well as from a software or hardware object that operates according to the techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

While a few embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A system for managing an optical communication device, comprising:
    an integrated circuit for controlling a parameter of the optical communication device;
    a monitoring component coupled to a memory register within the optical communication device, for monitoring a value of the parameter of the optical communication device that is stored within a memory register,
        wherein the monitoring component generates test data for transmission by the optical communication device, an output of the optical communication device in response to the test data are looped back to the monitoring component;
    a device interface, the device interface enabling two way communication between the optical communication device, the monitoring component, and an interface recognition/selection component, the two way communication comprising at least one of a management data input-output interface or a general purpose input/output interface;
    a digital agent interface that outputs the parameter monitored according to a digital agent selectable interface, the digital agent interface comprising one of a concise interface or a comprehensive interface, the digital agent interface is configured to receive an input in response to the output and forward the input to the device interface to adjust performance of the optical communication device by modifying the value of the parameter stored within the memory register; and
    an interface recognition/selection component that recognizes a communication protocol employed by the digital agent interface and loads a software logical interface that adapts the device interface to comply with communications protocols of the digital agent interface.

2. The system according to claim 1, wherein the monitoring component generates additional test signals in response to the output, the additional test signals are updated to the memory register or integrated circuit of the optical communication device for modifying the parameter of the optical communication device.

3. The system according to claim 1, wherein the parameter is selected from a group consisting of temperature, humidity, input signal level, external voltage supply, manufacturer name, model specification, optical power of light source, fiber attenuation, chromatic dispersion, alignment of fibers, bit rate of a communication method, polarization of light, power of received signal, bias current, extinction ratio, voltage supply to light source, and transmission power.

4. The system of claim 1, the concise interface enables control of the monitored parameter to adjust the performance of the optical communication device.

5. The system of claim 1, the comprehensive interface enables entry of company or device specific information into the memory register and modifying parameters of the optical communication device in accordance with the company or device specific information.

6. The system of claim 1, the monitoring component regularly communicates the monitored parameter to the digital agent through the device interface and initiates an alarm when the monitored parameter falls outside a desired range.

7. The system of claim 1 further comprising an intelligent agent component that analyzes communication data from the digital agent interface and infers an identity of the recognized communication protocol from the analysis.

8. The system of claim 7 wherein the intelligent agent component selects the software logical interface based on a probability of compatibility with the recognized communication protocol.

* * * * *